(12) United States Patent  
Ceccacci

(10) Patent No.: US 12,662,809 B2  
(45) Date of Patent: Jun. 23, 2026

(54) SYSTEM OF COUPLABLE PREFABRICATED PANELS FOR BUILDING

(71) Applicant: OC S.R.L., Pontinia (IT)

(72) Inventor: Gerardo Ceccacci, Pontinia (IT)

(73) Assignee: OC S.R.L., Pontinia (IT)

( * ) Notice: Subject to any disclaimer, the term of this patent is extended or adjusted under 35 U.S.C. 154(b) by 148 days.

(21) Appl. No.: 18/730,889

(22) PCT Filed: Jan. 31, 2023

(86) PCT No.: PCT/IB2023/050826  
§ 371 (c)(1),  
(2) Date: Jul. 22, 2024

(87) PCT Pub. No.: WO2023/148609  
PCT Pub. Date: Aug. 10, 2023

(65) Prior Publication Data  
US 2025/0092670 A1 Mar. 20, 2025

(30) Foreign Application Priority Data  
Feb. 2, 2022 (IT) ......................... 102022000001772

(51) Int. Cl.  
*E04B 1/61* (2006.01)  
*F16B 5/00* (2006.01)

(52) U.S. Cl.  
CPC .......... *E04B 1/6158* (2013.01); *F16B 5/0092* (2013.01)

(58) Field of Classification Search  
CPC ...... E04B 1/6158; E04B 2/721; E04B 1/4135; F16B 5/0052; F16B 5/0092; F16B 7/0473; F16B 35/04  
See application file for complete search history.

(56) References Cited

U.S. PATENT DOCUMENTS

| | | | | |
|---|---|---|---|---|
| 3,664,073 A | * | 5/1972 | Tucker | F16B 21/02 52/127.7 |
| 5,155,960 A | * | 10/1992 | Shaanan | F16B 21/02 24/DIG. 54 |
| 10,514,052 B2 | * | 12/2019 | Ceccacci | E04B 1/6158 |

FOREIGN PATENT DOCUMENTS

| | | | | |
|---|---|---|---|---|
| DE | 202007008824 U1 | * | 10/2007 | E04B 2/762 |
| DE | 202007003061 U1 | * | 7/2008 | F16B 7/0473 |

(Continued)

OTHER PUBLICATIONS

International Search Report for International Patent Application No. PCT/IB2023/050826, mailed May 3, 2023.

(Continued)

*Primary Examiner* — Theodore V Adamos  
(74) *Attorney, Agent, or Firm* — CANTOR COLBURN LLP

(57) ABSTRACT

Provided is a system of prefabricated panels couplable by a coupling device engaged in grooves with dovetail-shaped cross sections, each groove having two mutually facing steps. The coupling device has a metallic coupling element having a first and a second tapered elements with height along a vertical axis and symmetrical with respect to a first plane perpendicular to the vertical axis. A foil key rotates the coupling element from a rest position, in which each tapered element is inserted into a respective groove and free to move along the respective groove, to a locked position, in which each tapered element is inserted into the respective groove and constrained to the respective groove along the first reference plane, and vice versa. Each tapered element has a first and a second wings symmetrical with respect to a second reference plane and extending along the vertical axis with ends for engaging the steps.

24 Claims, 7 Drawing Sheets

(56) References Cited

FOREIGN PATENT DOCUMENTS

| | | | | | |
|----|---------|----|---|---------|-------------|
| EP | 3449065 | B1 | | 3/2020 | |
| GB | 2106211 | A | * | 4/1983 | ............ F16B 5/0092 |
| GB | 2595896 | A | * | 12/2021 | .............. E04B 9/26 |

OTHER PUBLICATIONS

Written Opinion for International Patent Application No. PCT/IB2023/050826, mailed May 3, 2023.

* cited by examiner

SYSTEM OF COUPLABLE PREFABRICATED PANELS FOR BUILDING

CROSS-REFERENCE TO RELATED APPLICATIONS

This application is a National Phase Application of PCT International Application PCT/IB2023/050826, having an International Filing Date of Jan. 31, 2023 which claims priority to Italian Application No. 102022000001772 filed Feb. 2, 2022, each of which is hereby incorporated by reference in its entirety.

FIELD OF THE INVENTION

The present invention relates to an improved system of couplable prefabricated building panels, in particular comprising a metallic coupling device and a first and a second prefabricated panel.

BACKGROUND ART

Prefabricated panels are used in the building industry to make walls, such as partition walls or movable walls, or to make doors.

Currently, a system for coupling prefabricated panels is known.

Said system comprises two prefabricated panels, a locking element for locking said two panels and a foil key for rotating said locking element and allowing the two prefabricated panels to switch from a first position, in which each of said panels is free to slide, to a second position, in which said panels are locked in a mutually fixed position by said locking element, and vice versa.

Said locking element substantially has, in a longitudinal section, the shape of an hourglass consisting of a first tapered element and a second tapered element, each having a first height and a second height, respectively, where said second height is equal to said first height. Said foil key is fast connected to the locking element and is arranged on a plane orthogonal to an axis passing through said first height and said second height.

In order for the foil key to be fast connected to the locking element, the foil key is mechanically fastened on said locking element. A considerable pressure is applied on said foil key until it is stably fastened on said locking element.

In order to facilitate the fastening of the foil key to the locking element, the latter is provided with two slits or recesses, arranged on the same plane at a middle part thereof, and said foil key is provided with a recess so that when the foil key is fastened on said locking element, each slit accommodates a portion of foil key close to said recess.

However, it is possible for the foil key not to be fastened to the locking element so as to be perfectly orthogonal.

Accordingly, after the coupling of two prefabricated panels, one prefabricated panel is often inclined with respect to the other one, with the disadvantage that at least a first surface of one prefabricated panel does not lie on the same plane (or parallel plane) of the respective surface of the other prefabricated panel.

Moreover, since the foil key is made of metal material and said locking element is made of plastic material, the operation of making the key fast connected to said locking element implies a removal of material from the locking element itself.

Removing material from the locking element can also cause the lack of coplanarity of the surfaces of the prefabricated panels when said prefabricated panels are coupled.

A solution is provided by patent EP3449065 B1, in which the Applicant has introduced a system allowing a first prefabricated panel to be coupled to a second prefabricated panel so that they are parallel and so that a first and/or a second surface (opposite to said first surface) of said first prefabricated panel is coplanar with a first surface and/or a second surface (opposite to said first surface), respectively, of said second prefabricated panel.

Indeed, each prefabricated panel comprises at least a first surface and a second surface, which is opposite to said first surface.

Said surfaces can be, for example, the surfaces perpendicular to a support surface when the prefabricated panels are arranged vertically on said support surface.

As shown in FIGS. 6A and 6B of the aforesaid patent, the locking element, which is in the coupling position of the panels, begins interfering with the grooves of the profile only when rotated by 90°, where the cross section of the locking element has excess material, conventionally of about 0.3 mm, which is deformed by the mechanical rotating action.

Although such a locking element can basically be made of any material, the Applicant has recently experimentally verified that the locking element must be almost exclusively made of plastic to provide a satisfactory operation. However, plastic has increased costs as well as a shorter lifespan than metal. Irrespective of this, the Applicant has further verified that making the locking element of metal as described in EP3449065 B1 would significantly narrow the dimensional field of tolerance, making the application thereof impossible or highly difficult and inconvenient for this category of construction elements (panels).

A further solution is provided by patent DE202007003061U1, in which the Applicant has introduced a device allowing a first prefabricated panel and a second prefabricated panel to be coupled.

The fastening element is introduced in a first embodiment, which provides a plate-like device made of metal (preferably steel) or plastic. The device comprises two coupling elements protruding at the top, two coupling elements protruding at the bottom, and a middle plate integrally connected to said coupling elements. The two pairs of coupling elements are arranged in mutually transverse directions and extend radially with respect to the rotation axis of the coupling device. Each coupling element comprises a first section, obliquely extending from the plane of the plate of the coupling device, and a second end section, extending parallel to the plane of the plate of the coupling device. Said end section has a rounded edge at one of the two ends and an edge with a straight angle at the opposite end, which serves as a stop.

As shown in FIGS. 2 and 3 of the aforesaid patent, the locking element must be inserted first into the groove of the first prefabricated panel; then, the second prefabricated panel must slide in direction perpendicular to the first prefabricated panel so that the second locking element, opposite to the first locking element, is inserted into the groove of the second prefabricated element. At this point, the coupling device must be rotated by 90° in a predetermined direction in order to fix the position of the two prefabricated panels. It should be noted that the panels—and not the connecting element—are moved.

It should be noted that said predetermined direction is dictated by the fact that the end portion of the locking elements has only one of the two rounded ends, while the opposite end is squared off.

It should be also noted that the aforesaid prefabricated panels cannot have a groove with a dovetail-shaped cross section because the geometrical shape of the locking elements would not allow the correct anchoring.

It should be further noted that in order to increase the adherence of the locking element to the inner surfaces of the grooves on the prefabricated panels, there are protruding elements, obtained by means of mechanical processing, on the surface of the coupling device in contact with the surface of the prefabricated panels and on the surface of the locking elements; said protruding elements sink into the prefabricated panels when the locking device is rotated.

The Applicant has also introduced an alternative embodiment which allows fastening the two prefabricated panels even in a position in which said panels are mutually parallel. Such a solution includes fastening the two plates forming the coupling device by means of a middle rivet and rotating the plates themselves in two successive moments for the respective fastening of the first locking element in the groove of the first prefabricated panel and the successive respective fastening of the second locking element in the groove of the second prefabricated panel. Therefore, it should be noted that said plates, fastened by means of the rivet, are not mutually integral, the mutual rotation therefore always being possible.

Therefore, it is apparent that such a coupling device has production disadvantages in terms of costs and simplicity, associated with both the need to carry out surface treatments adapted to introduce said protruding profiles and the presence of the rivet, whose positioning requires specific tools.

The need is therefore felt to provide a system in which the coupling device can be used on prefabricated panels provided with a groove with a dovetail-shaped cross section and in which the locking element, once tightened, ensures the maximum grip on the groove of the prefabricated panels. The need is also felt to provide a system in which the locking device is simple and affordable to manufacture and has optimal features of reliability. At the same time, the need is felt to provide a system which allows a quick and simple connection of the prefabricated panels.

SUMMARY OF THE INVENTION

It is the object of the present invention to provide a system and a coupling device for prefabricated buildings which fully or partially overcomes the disadvantages and solves the problems of the prior art.

The present invention relates to a system and a device according to the appended claims.

DETAILED DESCRIPTION

List of Drawings

The present invention will now be described, by way of non-limiting illustration, according to an embodiment thereof, with particular reference to the accompanying drawings, in which.

Figures 8, 9:
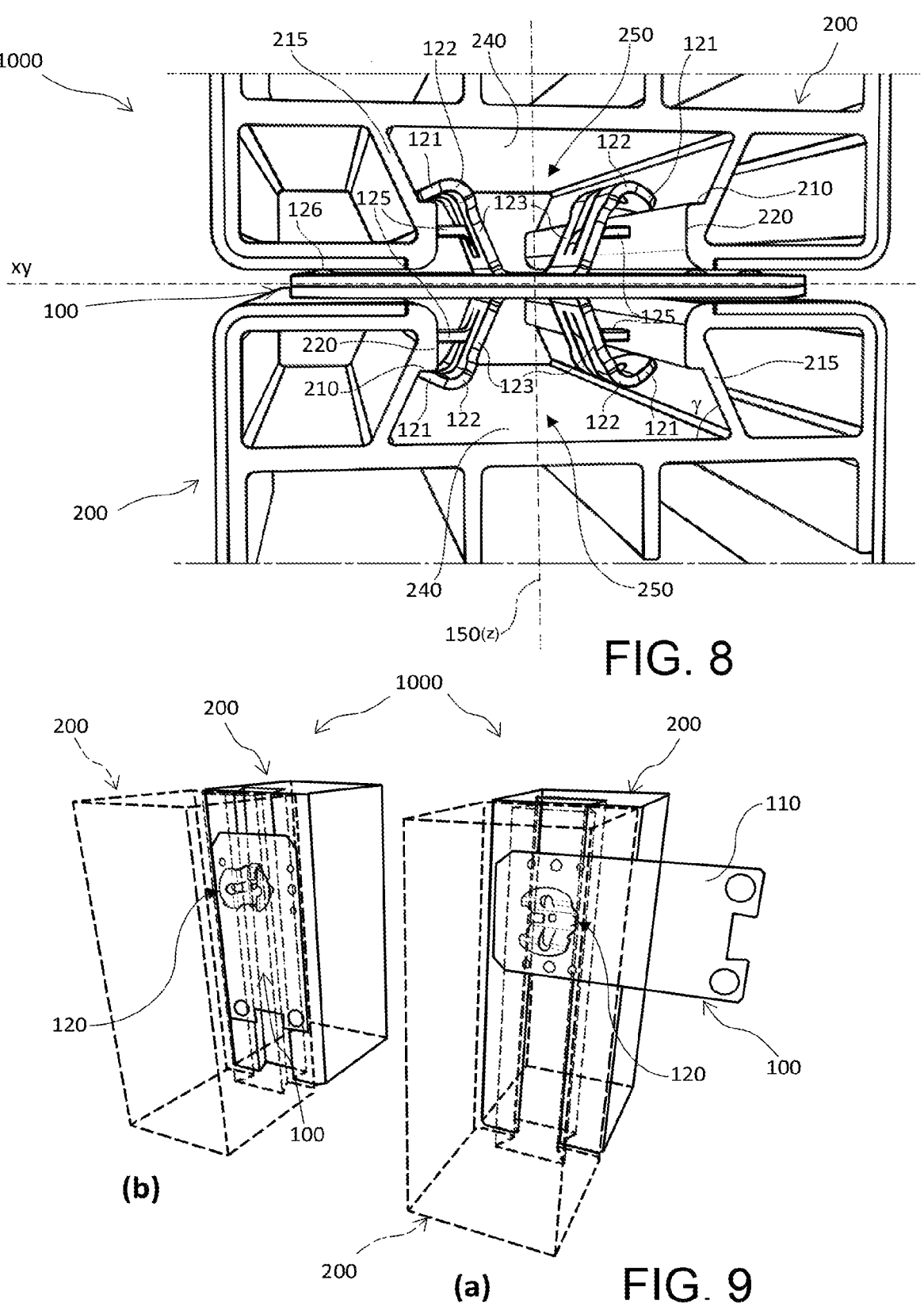
Figures 10, 11:
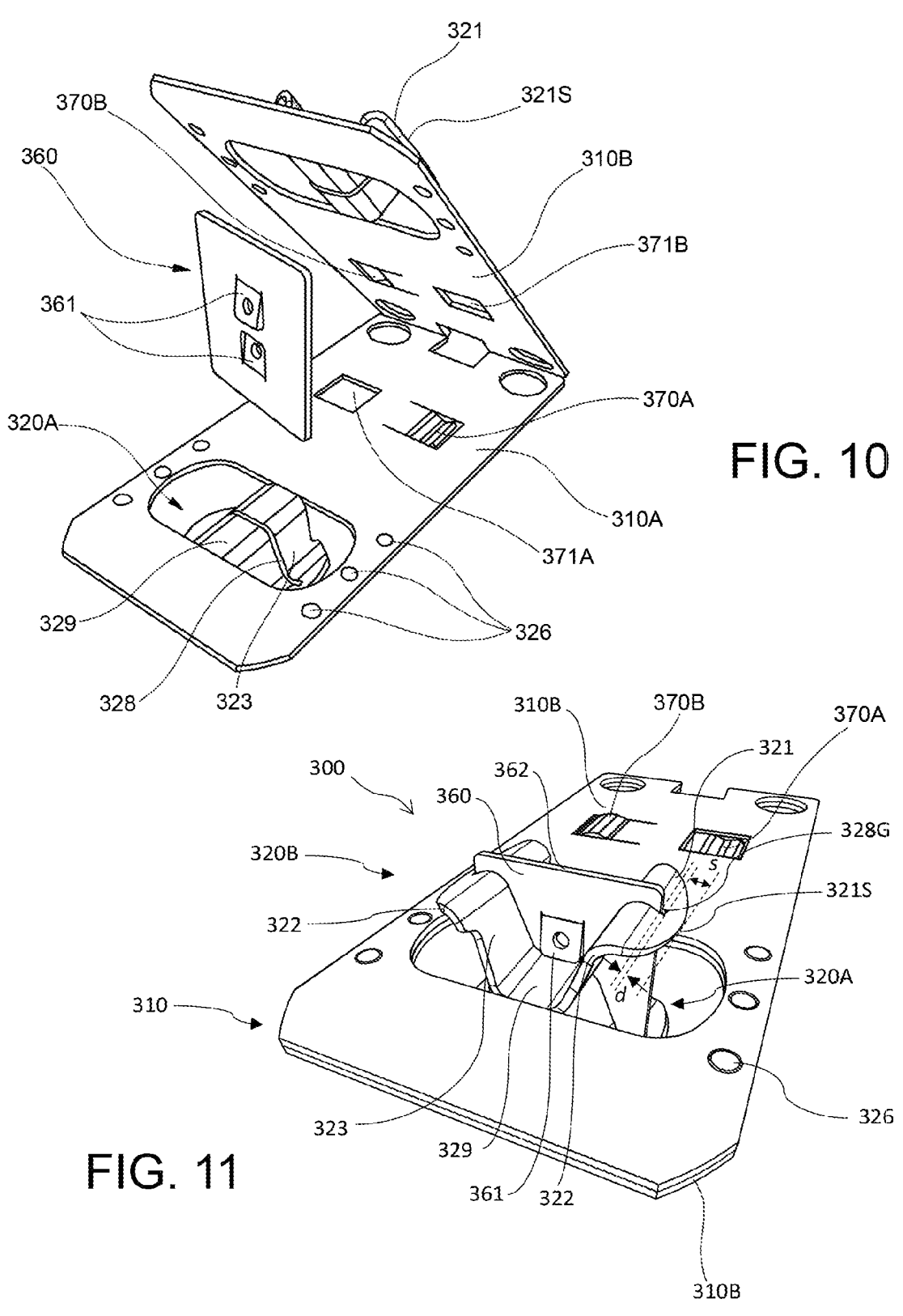
Figure 12:
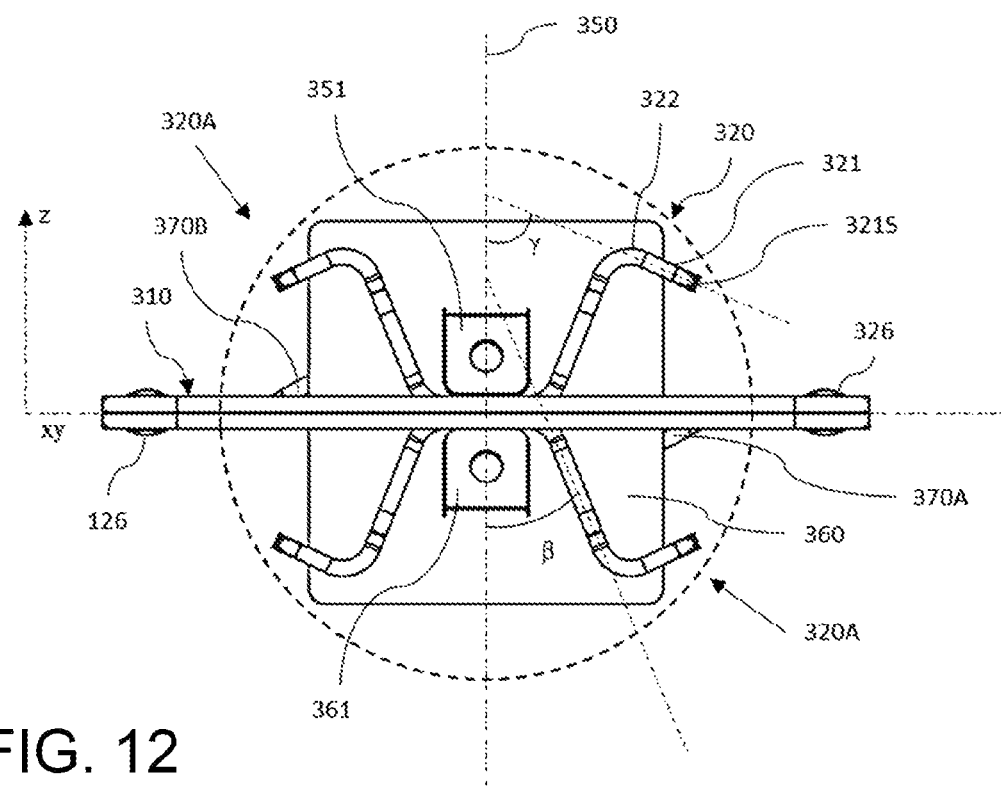
Figure 13:
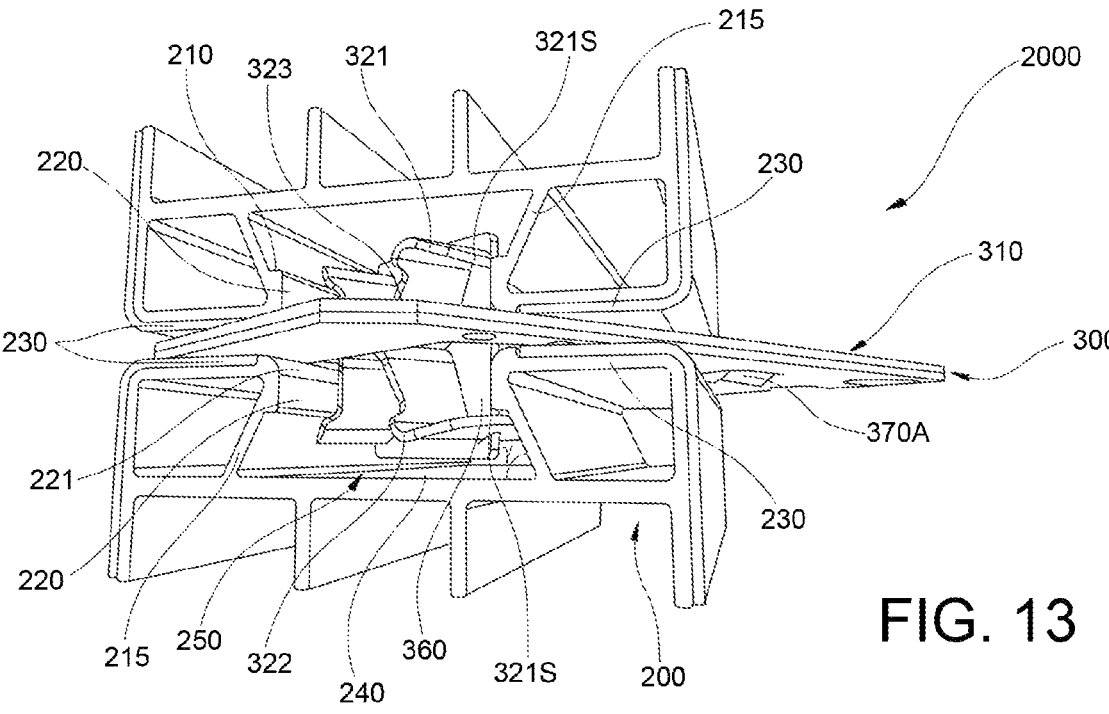
Figure 14:
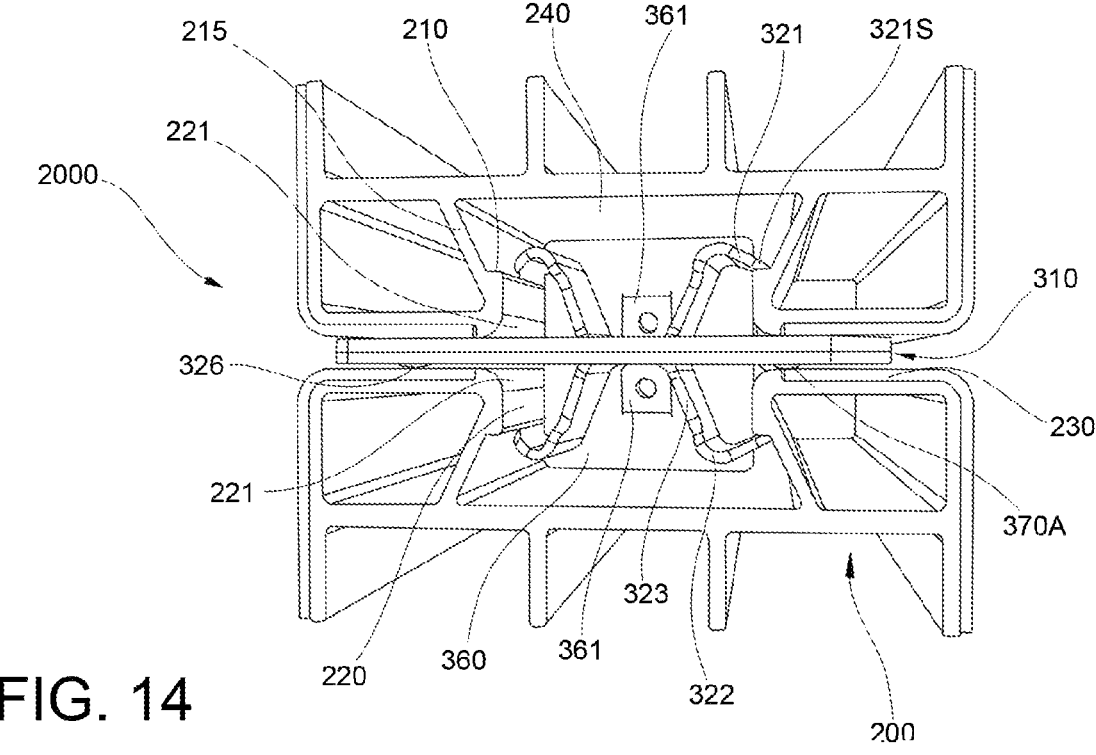
Figure 15:
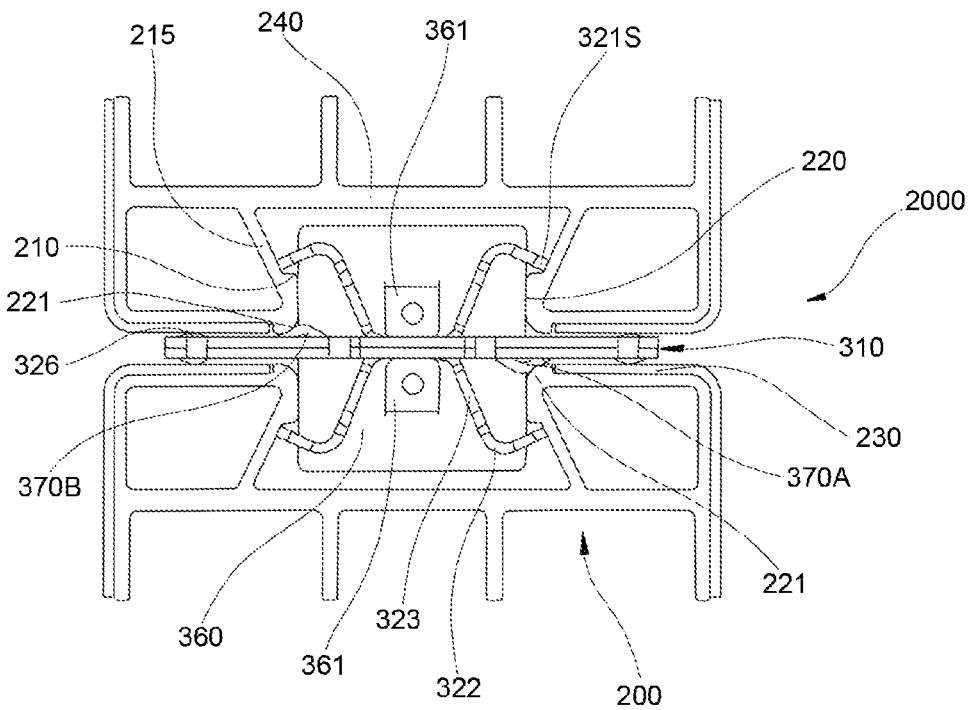

FIG. 8 shows two coupled prefabricated panels, in which the key and the locking element according to an embodiment of the invention are completely rotated and engaged in the panels; and FIG. 9 shows in (a) the insertion of the key, without the rotation of the preceding drawings having yet started, and in (b) the insertion and complete rotation of the key as in FIG. 8, with the blade of the key completely inserted between the panels;

FIG. 10 shows an exploded view of a further different embodiment of the key and the locking element according to the invention, in which both the key and the locking element are in two pieces which are mutually and simultaneously fastened to the key by means of specific fastening means;

FIG. 11 shows the key and the locking element in FIG. 10 in the operating status thereof (the parts are fastened to one another);

FIG. 12 shows a front view of the key and the locking element in FIGS. 10 and 11;

FIG. 13 shows a position of the key and the locking element according to FIGS. 10-12, in which the engaging rotation thereof in two mutually facing panels has started, without such an engagement having started;

FIG. 14 shows a position of the key and the locking element according to FIGS. 10-11, in which the engaging rotation thereof in two mutually facing panels has started, with the engagement having just started; and FIG. 15 shows two coupled prefabricated panels, in which the key and the locking element according to FIGS. 10-12 are completely rotated and engaged in the panels.

It is specified herein that elements of different embodiments can be combined together to provide further embodiments without restrictions while respecting the technical concept of the invention, as those ordinarily skilled in the art effortlessly understand from the description.

The present description further relates to the prior art for the implementation thereof, concerning the detail features not described, such as elements of minor importance usually used in the prior art in solutions of the same type, for example.

When an element is introduced, it is always understood that there can be "at least one" or "one or more".

When a list of elements or features is given in this description, it is understood that the finding according to the invention "comprises" or alternatively "consists of" such elements.

When listing features within the same sentence or bullet list, one or more of the individual features can be included in the invention without connection to the other features on the list.

Two or more of the parts (elements, devices, systems) described below can be freely associated and considered as part kits according to the invention.

It is worth noting herein that the term "integral" means an object or element of one device or structure firmly connected to another one. Such a term can also be rendered with a different term, such as "fast-connected". Within the scope of the present patent, it is understood that both terms define the same concept set out above.

EMBODIMENTS

With reference to FIGS. 1-8, it is described a system 1000 for coupling two prefabricated building panels 200, said system comprising a first and a second prefabricated panel 200, as well as at least one coupling device 100 configured to couple said first prefabricated panel with said second prefabricated panel 200 (see FIG. 9). The two prefabricated panels are identical for reasons of construction simplicity, but nothing prevents them from being different, with a non-symmetrical coupling device equally incorporating the fundamental concept of the invention.

Figure 6:
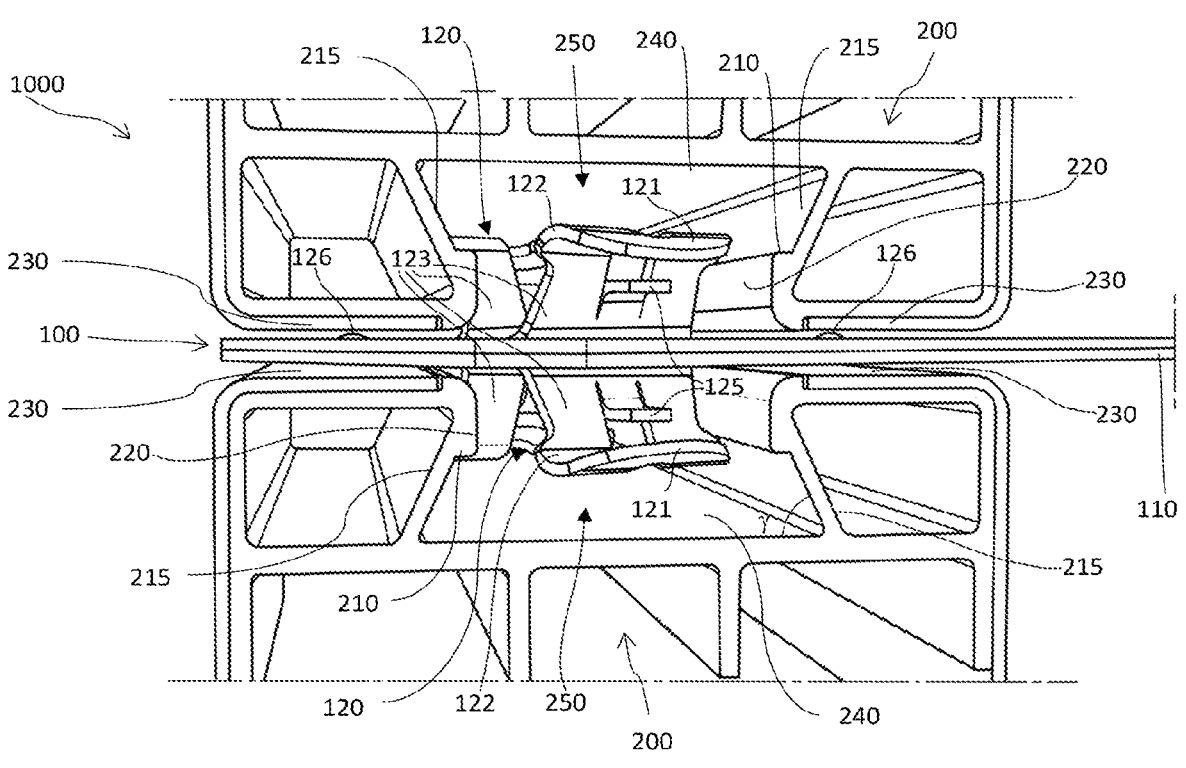
FIG. 6 shows a position of the key and the locking element according to an embodiment of the invention, in which the engaging rotation thereof in two mutually facing panels has started, without such an engagement having started.
Figure 7:
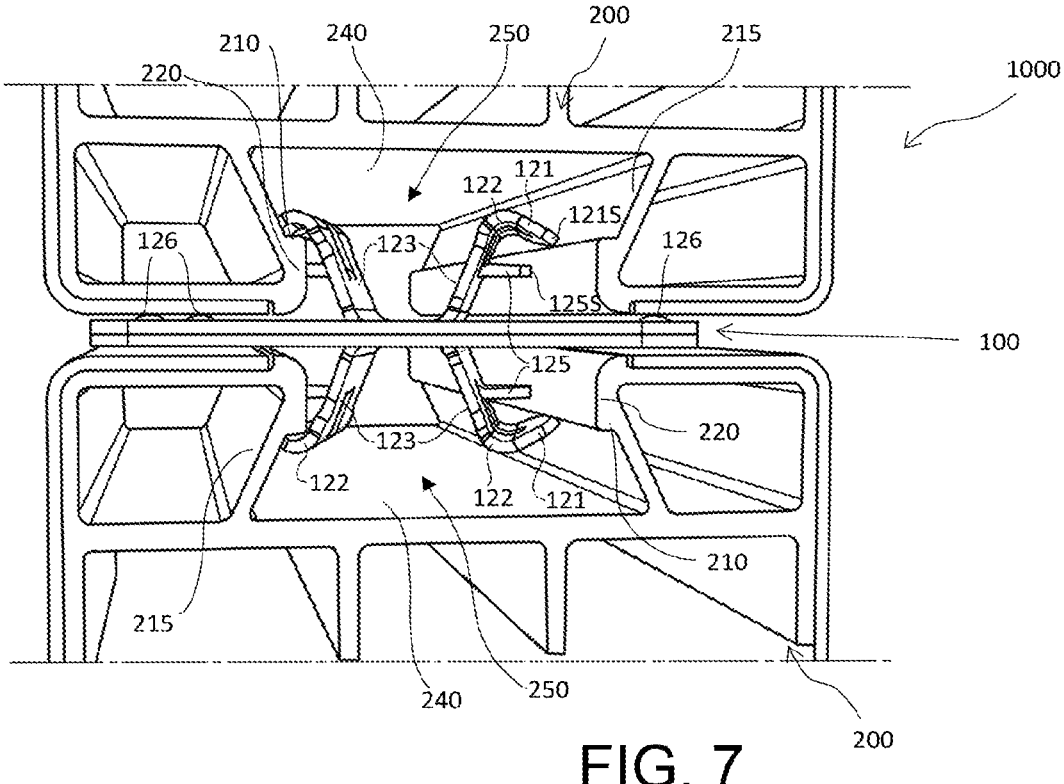
FIG. 7 shows a position of the key and the locking element according to an embodiment of the invention, in which the engaging rotation thereof in two mutually facing panels has started, with the engagement having just started.

In greater detail, and with specific reference to FIGS. 6-8, according to an aspect of the invention, the first and second prefabricated panels 200 have a first and a second groove 250, respectively, with dovetail-shaped cross sections. Preferably, each groove 250 consists of a first and a second oblique side 215 each having a first end and a second end, and a third side 240 joining the first end of said first oblique side 215 to the first end of said second oblique side 215.

Even more specifically, according to an aspect of the invention, the first and second oblique sides 215 can have a first projection and a second projection 210, 220, respectively, each arranged at the second end of a respective oblique side 215, respectively. Such a projection can protrude so as to form a first and a second step, respectively, with the respective oblique side 215 between a first protruding wall 210 adjacent to said oblique side, and a second protruding wall 220 adjacent to said first protruding wall, said first and second projections facing each other. The second protruding wall 220 can further be adjacent to a front wall 230, as shown below.

In order to couple the panels as described the system 1000 comprises at least one coupling device 100, which is also the specific object of the present invention. Such a coupling device comprises a coupling element or coupling means 120 comprising or consisting of identical first 120A and second 120B tapered elements (if the two panels to be coupled are identical) with height along the vertical axis z 150.

The tapered elements 120A, 120B advantageously are symmetrical with respect to a first reference plane xy (which is perpendicular to the vertical axis z) and have a first and a second mutually facing base 129, respectively.

The first and second bases can also be formed in a single piece and even be an integral part of the foil described below.

The first and second tapered elements extend over the first reference plane (xy) in a first length in said cross section, perpendicularly to said vertical axis z 150, and a second length perpendicular to said cross section.

In addition to the coupling element 120, the coupling device comprises a foil key 110, known per se, being fast connected to the coupling element 120 and extending along the first reference plane xy. Such a foil key, or simply "foil", is configured to rotate said coupling element 120 from a rest position, in which each tapered element is inserted into a respective groove 250 with said first length substantially oriented along said respective groove 250 so that no tapered element is constrained to the respective groove along said plane xy, to a locked position, in which each tapered element is inserted into the respective groove 250 with said second length substantially oriented along said respective groove 250 so that each tapered element is constrained to the respective groove along said plane xy, and vice versa.

This is clearly shown in FIG. 9, with the panels or "profiles" in transparency, and also in FIGS. 6-8.

Advantageously, since the tapered elements 120A, 120B are fast connected to the foil key 110, they cannot rotate with respect to one another, and in particular they are on the same plane perpendicular to the first reference plane xy, i.e., a plane parallel to the third reference plane xz. Such a feature allows obtaining a sturdy and solid coupling between the coupling device 100 and the prefabricated panel 200, and secondly obtaining a simple locking process of the two coupling elements 120 in the respective grooves 250.

According to the invention, the coupling element 120 can be made of metal (such as a particularly affordable metal sheet) to avoid the aforesaid problems of plastic of the known art. However, by switching to metal, the embodiments of the prior art are no longer functional for coupling the panels.

To this purpose, the first 120A and second 120B tapered elements comprise a first wing and a second wing 121, 122, 123, 125 which are symmetrical with respect to a second reference plane yz, defined by a longitudinal axis y and a vertical axis z 150 perpendicular to said first reference plane xy and extending along said vertical axis z 150, the first and second wings each comprising a plurality of fast connected portions and each with a respective main extension direction. Specifically:

- a first linear portion 123 extending from said first and second base 129, respectively, with an angle $10 < \beta < 45°$ with respect to said vertical axis z 150, preferably $16 < \beta < 28°$ to obtain a more effective coupling of the wings with the profile;
- a second elbow portion 122 extending from said first linear portion 123;
- a third linear portion 121 extending from said second elbow portion 122 up to a first free end 121S with an angle $\gamma \approx 90° - \beta$ with a tolerance of $\pm 2°$ with respect to said vertical axis z 150.

The first 121S and second 125S free ends can be rounded in shape transversely to the respective main extension direction thereof so that when the first and second prefabricated panels are in the locked position, each first protruding wall 210 abuts against said first free end 121S and each second protruding wall 220 abuts against said second free end 125S.

Figure 4:
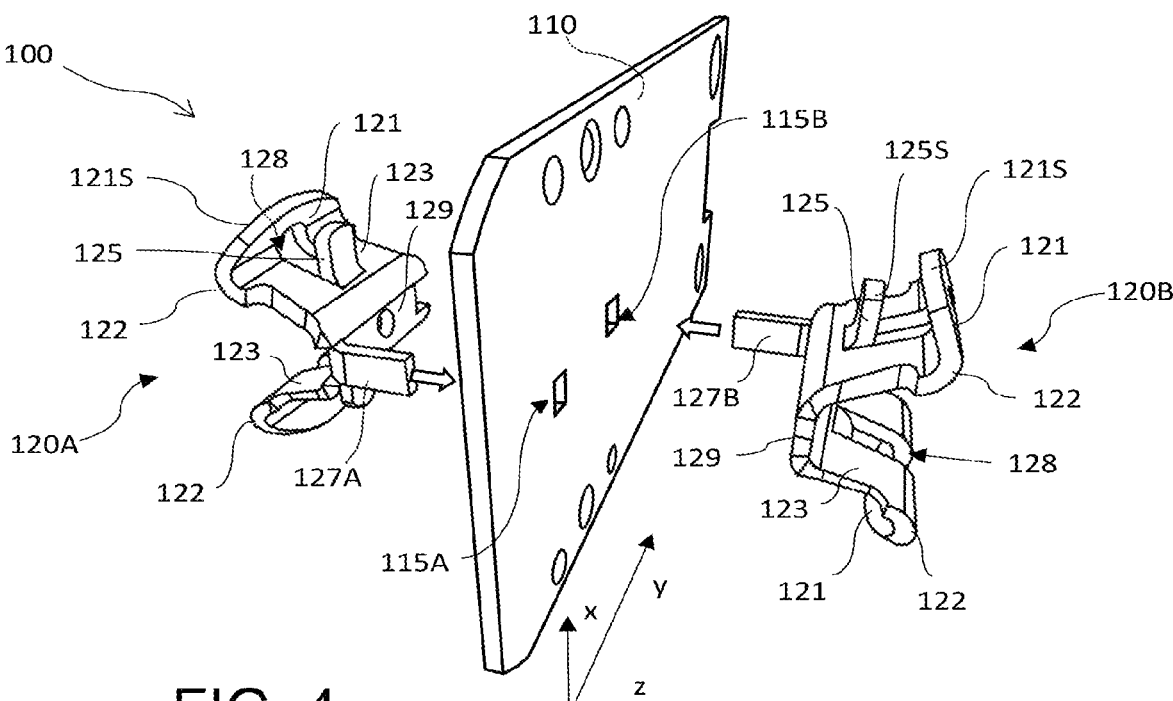
FIG. 4 shows an exploded view of a further embodiment of the key and the locking element according to the invention, in which the locking element is in two pieces which are mutually and simultaneously fastened to the key.
Figure 5:
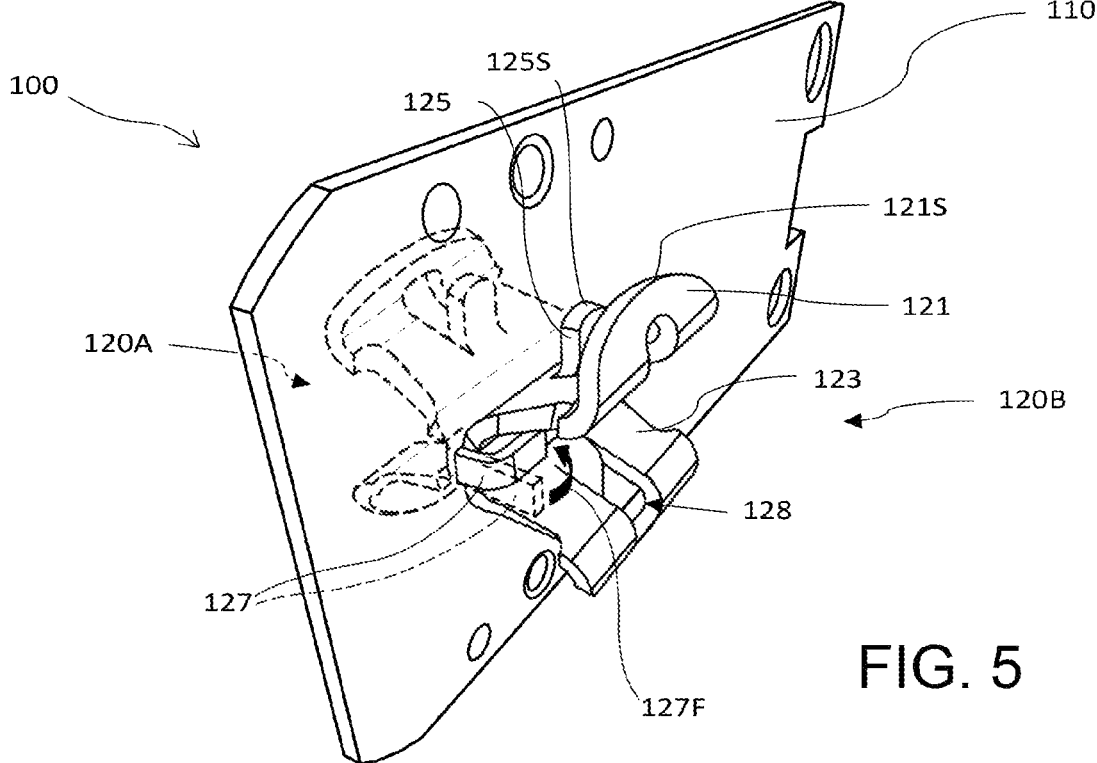
FIG. 5 shows the key and the locking element in FIG. 4 in the operating status thereof (the parts are fastened to one another)

According to a specific embodiment, a fourth projecting portion 125 protruding from said first linear portion 123, away from said vertical axis z 150, up to a second free end 125S, is additionally included. The second free end 125S is rounded in shape transversely to the respective main extension direction thereof and is configured to abut against said second protruding wall 220 in the locked position. In this case, the fourth projecting portion 125 is obtained with a recess from the first linear portion 123, leaving a corresponding opening 128, as shown in FIG. 4.

If the first 121S and the second 125S free end in the respective embodiments were not rounded in shape (in locked position along the direction of groove 250), the wings 120A and 120B would experience significant bending which could result in inelastic deformations, in addition to the need to apply increased force. Instead, the rounded shaping ensures that a low force is applied and operations are always under elastic deformation conditions of the metal of the wings (preferably a sheet metal).

The foil key 110 can also be made of metal (preferably metal sheet due to the lower costs), but the invention is also functional with a foil made of plastic or other rigid material.

Figure 1:
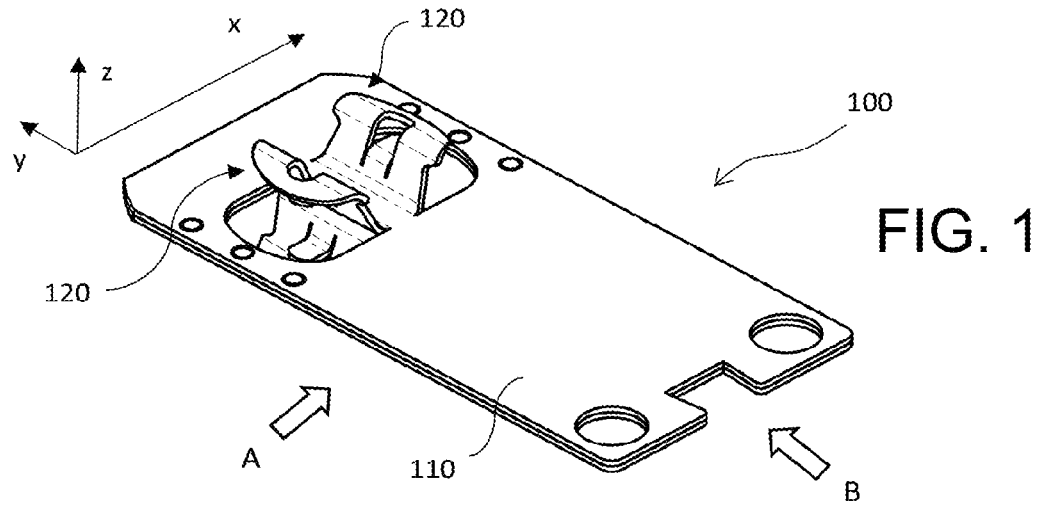
FIG. 1 is a perspective view of the key and the locking element of the system according to an embodiment of the invention.
Figure 2:
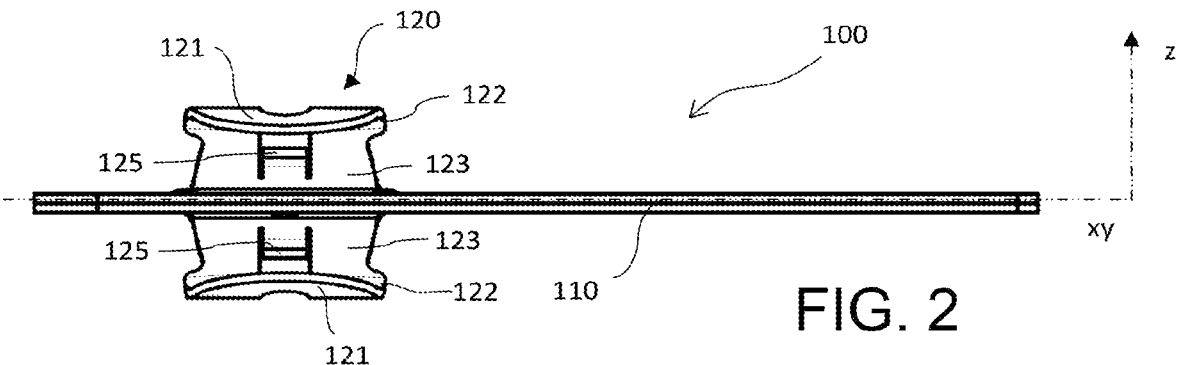
FIG. 2 shows a side view of the key and the locking element in FIG. 1.
Figure 3:
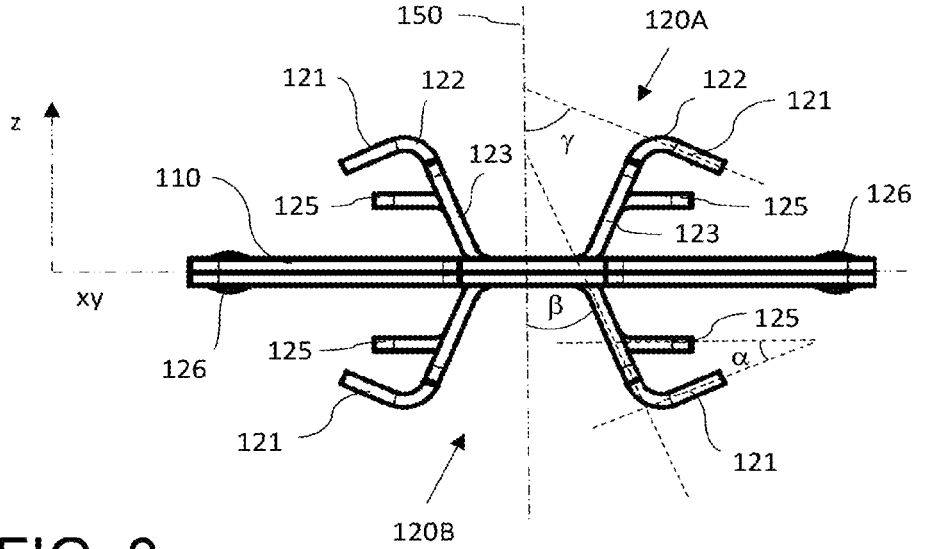
FIG. 3 shows a front view of the key and the locking element in FIGS. 1 and 2.

With specific reference to FIG. 3, the third linear portion 121 and the fourth projecting portion 125 can form an angle $\alpha \cong \beta$ therebetween, which ensures an optimal grip of the step.

In a constructionally convenient manner, according to an aspect of the invention, the first 120A and second 120B tapered elements can be formed in a single piece, or they can be formed in two separate pieces and integrally joined along the bases 129 for increased production simplicity. To this purpose, according to a preferred embodiment and with specific reference to FIG. 4, a fifth coupling portion 127A, 127B can be comprised for each tapered element 120A, 120B, the fifth coupling portion projecting with respect to said base 129, crossing a corresponding opening 115A, 115B of the foil key 110 and being folded (127F) about the base 129 of the tapered element 120A, 120B which is symmetrical with respect to said first reference plane xy. Obviously, this is only one manner of making the two tapered parts mutually fast connected, resulting in the advantage of a simplified construction. Actually, in a different embodiment, there can be two wings placed in a "V" instead of the two tapered parts, thus eliminating, or almost eliminating, the extension of the base 129.

According to an aspect of the invention, the foil key 110 can have a first surface and a second surface, opposite to said first surface, there being provided, on each of said first and second surfaces, at least one boss 126 configured to contact a front wall 230 which is adjacent to said second protruding wall 220 and perpendicular to said axis 150. Preferably, for efficacy of positioning of the foil key, said at least one boss 126 on said first surface is offset with respect to said at least one boss 126 on said second surface. In particular, there are two bosses on one of the first and second surfaces and, on the other of the first and second surfaces, there is a boss positioned between the two bosses along the first reference plane xy.

Referring now to FIGS. 10 to 15, it is shown a different embodiment of a system 2000 falling under the same concept of the invention.

In this case, the panels 200 are identical to those described above, however the shape of the coupling device 300 configured to couple said first prefabricated panel with said second prefabricated panel 200 changes slightly.

Indeed, the features in common with the preceding embodiment are that the coupling device 300 comprises:

a coupling element 320 comprising or consisting of identical first 320A and second 320B tapered elements with height along a vertical axis z 350 of the coupling element 320, said tapered elements 320A, 320B being mutually symmetrical with respect to a first reference plane xy which is perpendicular to said vertical axis z and having a first and a second mutually facing base 329, respectively, the first and second tapered elements extending over the first reference plane xy in a first length in said cross section, perpendicularly to said vertical axis z 350, and a second length perpendicular to said cross section;

a foil key 310 being fast connected to said coupling element 320 and extending over said first reference plane xy, configured to rotate said coupling element 320 from a rest position, in which each tapered element is inserted into a respective groove 250 with said first length substantially oriented along said respective groove 250 so that neither tapered element is constrained to the respective groove along said first reference plane xy, to a locked position, in which each tapered element is inserted into the respective groove 250 with said second length substantially oriented along said respective groove 250 so that each tapered element is constrained to the respective groove along said first reference plane xy, and vice versa.

The following, individually optional features are also in common:

the coupling element 320 is made of metal;

the first 320A and second 320B tapered elements comprise a first wing and a second wing 321, 322, 323 which are symmetrical with respect to a second reference plane yz, defined by a longitudinal axis y and a vertical axis z 150 perpendicular to said first reference plane xy and extending along said vertical axis z 350, the first and second wings each comprising a plurality of portions, each with a respective main extension direction and integrally connected;

a first linear portion 323 extending from said first and second bases 329, respectively, with an angle $10 < \beta < 45°$ with respect to said vertical axis z 350;

a second elbow portion 322 extending from said first linear portion 323;

a third linear portion 321 extending from said second elbow portion 322 up to a first free end 321S with an angle $\gamma \cong 90° - \beta$ with a tolerance of $\pm 2°$ with respect to said vertical axis z 350;

in which said first free end 321S is rounded in shape transversely to the respective main extension direction thereof so that when the first and second prefabricated panels are in the locked position, each first protruding wall 210 abuts against said first free end 321S.

Also in this embodiment, the coupling element 320 can be made of sheet metal, and the foil key 310 can be made of metal, preferably of sheet metal for cost savings. Moreover, again as in the preceding embodiment, the first 320A and second 320B tapered elements can be formed in a single piece or, for ease of production, the first 320A and second 320B tapered elements can be formed in two separate pieces and integrally connected along said first and second bases 329 through said foil key 310.

In particular, according to a differentiated aspect of this embodiment, the first 320A and second 320B tapered elements comprise a through slit 328 along said vertical axis z 350 and adapted to receive an inserted metal reinforcing element 360, preferably made of sheet metal, in which said through slit 328 in the first and second wings completely crosses the first and second bases 329, the first linear portion 323 and the second elbow portion 322, while it partially crosses the third linear portion 321 along a direction perpendicular to said vertical axis z 350 (the direction of said first length, for example), the through slit 328 having a through slit end which falls in front of the first free end 321S. In particular, the distance between the end of the slit and the rounded end 321S is $s > 0$, the exact value depending on the type of metal selected or thickness of the wings.

As shown in FIG. 11, when the reinforcing element 360 is inserted into the slit, an edge 362 of the reinforcing element oriented towards said first free end 321S is at a distance d>0 from the through slit end, distance d being sized to provide a maximum retraction of the first and second wings in the direction of said first length in the locked position. Thereby, the elasticity of the wings is exploited to ensure sufficient rigidity of the device, but up to a certain degree. Those ordinarily skilled in the art will be able to effortlessly size the distance d (and s between the end of the slit and the rounded end) based on the materials used, sizes and strains to be sustained in the practical production cases.

According to an aspect of the invention, the reinforcing element 360 comprises fastening means 361 to said first tapered element 320A and second tapered element 320B, the fastening means being configured to fasten the reinforcing element 360 after the insertion into said through slit 328.

In particular, the fastening means 361 can conveniently comprise two tongues which are inelastically extendible in a direction perpendicular to said reinforcing element so as to counteract with the first or second base 329 outside said through slit 328.

Advantageously, for reasons of construction simplicity and therefore cost savings, the first 320A and second 320B tapered elements can be formed in a single piece with a first foil semi-key 310A and a second foil semi-key 310B, respectively, which are fastened one against each other on the side of the first and second bases (329) through the reinforcing element 360 so as to form the coupling device 300, as clearly shown in FIG. 10.

Also in this embodiment, as in the preceding one, the foil key 310 can have a first surface and a second surface, opposite to said first surface, there being provided, on each of said first and second surfaces, at least one boss 326 configured to contact a front wall 230 adjacent to said second protruding wall 220 and perpendicular to said axis 350. Advantageously, for reasons of positioning stability of the foil, the at least one boss 326 on said first surface is offset with respect to the at least one boss 326 on said second surface.

In particular, there can conveniently be two bosses between the first and second surfaces, and on the other of the first and second surfaces, there is a boss positioned between the two bosses along said first reference plane xy.

This allows obtaining the effect of a correct positioning of the device between the panels by a tolerance fit because the bosses cover several sufficiently offset points.

Finally, also in this embodiment, it is preferable that 16<β<28°, which allows an improved grip of the wings on the steps of the panels.

Referring again to FIGS. 10-15, a further differentiating and optional aspect of this embodiment is represented by the protruding elements 370A, 370B and the slots 371A, 371B. The two protruding elements 370A, 370B are obtained through a "U"-shaped recess on the flat surface of each foil semi-key. The projecting portion of material is therefore partially folded onto itself in order to form a protruding element 370A, 370B, which develops in height along the vertical axis z 150 (axis z).

The two slots 371A, 371B are, on each foil semi-key, in symmetrical position with respect to said vertical axis z 150, so that when the two foil semi-keys overlap each other (FIG. 10), each protruding element of a foil semi-key faces the corresponding slot of the other foil semi-key. Each protruding element 370A, 370B is configured to come into contact with a curved wall 221 interposed between said second protruding wall 220 and said front wall 230.

Thereby, when the first and second prefabricated panels are in the locked position, each first protruding wall 210 abuts against said first free end 321S of the third linear portion 321 and simultaneously each protruding element 370A, 370B abuts against said curved wall 221. Such a dual action creates a clamping force which ensures an optimal grip between the coupling device and the prefabricated panel.

A method for coupling a first and a second prefabricated panel 200 through the coupling device according to any one of the embodiments of the present description is also defined, comprising the following steps:

A. bringing the first and second prefabricated panel 200 close to each other, so that the respective groove directions are parallel and the first and second groove 250 are mutually facing;

B. inserting the coupling element 120; 320 into the grooves 250 so that the longitudinal axis y of the foil key 110; 310 is perpendicular to said respective groove directions;

C. rotating the coupling device 100; 300 about the vertical axis z so that the longitudinal axis y is at an angle of 0-30° relative to said respective groove directions and at least two-thirds of the foil key 110; 310 lies between the first and second prefabricated panels 200. The longitudinal axis can also be at zero degrees, i.e., parallel to the grooves, with the key completely inserted between the panels.

It is worth noting that in the German utility model mentioned above, it is not the key to be moved and inserted between the panels, rather the panels slided so as to insert the coupling elements into the grooves, with apparent increased difficulty and construction slowness.

Advantages of the Invention

Among the advantages of the solution disclosed above, it is worth noting that the system of the invention ensures that the two prefabricated panels, having grooves with dovetail-shaped cross section, are coupled so as to be parallel, thus avoiding one prefabricated panel from being inclined with respect to the other one.

The coupling quality is optimal also using metal coupling means, in particular made of sheet metal, with a significant savings in production and assembly costs, in addition to ensuring superior resistance in terms of reaction to fire.

Further advantages of the described solution are the construction simplicity and thus the cost savings of the locking device, characterized in that the two tapered parts are mutually fast connected. Moreover, a sturdy and solid coupling results from such a feature, so that once locked, the two prefabricated panels cannot rotate with respect to each other and, at the same time, the locking procedure is simple and fast.

The presence of the at least one boss also allows obtaining a stable positioning of the foil.

The invention claimed is:

1. A coupling device for a system of couplable prefabricated panels, comprising a first prefabricated panel and a second prefabricated panel, the first prefabricated panel having a first groove, and the second prefabricated panel having a second groove, the first groove and the second groove, respectively, having dovetail-shaped cross sections, each groove being formed by a first oblique side and a second oblique side each having a first end and a second end, and a third side joining the first end of said first oblique side to the first end of said second oblique side, the first and second oblique sides having a first projection and a second projection, respectively, each projection respectively arranged at the second end of a respective oblique side and protruding to respectively form a first step and a second step with the respective oblique side between a first protruding wall adjacent to said respective oblique side and a second protruding wall adjacent to said first protruding wall, said first and second projections facing each other, wherein the coupling device comprises:

a foil key extending over a first reference plane defined by a transversal axis and a longitudinal axis;

a metallic coupling element extending from said first reference plane, the metallic coupling element comprising:

a first tapered element extending to a first predefined height on a first side of said first reference plane;

a second tapered element extending to a second predefined height on a second side of said first reference plane opposite to said first side, said first and second tapered elements comprising a first and a second mutually facing bases, respectively, each extending along a first length and a second length on the first reference plane;

wherein said first and second tapered elements each comprises a first wing and a second wing symmetrical with respect to a second reference plane defined by the longitudinal axis and a vertical axis perpendicular to said first reference plane, the first wing and the second wing each comprising a plurality of fast-connected portions, defined on a third reference plane, which is defined by the transversal axis and the vertical axis as follows:

a first linear portion extending from said first and second bases, respectively, with an angle $10<\beta<45°$ with respect to said vertical axis;

a second elbow portion extending from said first linear portion;

wherein the foil key is configured to rotate said metallic coupling element from a rest position in which each tapered element is configured to be inserted in the respective groove with said first length substantially oriented along said respective groove so that each tapered element is free to move along the respective groove, to a locked position in which each tapered element is inserted in the respective groove with said second length substantially oriented along said respective groove so that each tapered element is constrained to the respective groove along said first reference plane, and vice versa;

wherein the first and second tapered elements are symmetrical with respect to the first reference plane;

the first and the second tapered elements are fast connected to said foil key;

the first wing and the second wing each comprise a third linear portion extending from said second elbow portion up to a first free end with an angle $\gamma\cong90°-\beta$ with a tolerance of $\pm2°$ with respect to said vertical axis; and wherein said first free end is rounded-shaped on both sides transversely to a main direction of extension of the respective first free end so that, when the first and second prefabricated panels are in the locked position, each first protruding wall abuts against said first free end.

2. The coupling device of claim 1, wherein said metallic coupling element is made of metal sheet.

3. The coupling device of claim 1, wherein said foil key is made of metal.

4. The coupling device of claim 3, wherein, when the metal reinforcing element is inserted in the through slit, an edge of the metal reinforcing element oriented towards said first free end is at a distance $d>0$ from the through slit end, the distance d being sized to provide a maximum moving back of the first and second wings in a direction of said first length in the locked position.

5. The coupling device of claim 1, wherein the first and second tapered elements comprise a through slit along said vertical axis adapted to receive a metal reinforcing element, and wherein, in the first and second wings, said through slit completely crosses the first and second bases, the first linear portion and the second elbow portion, while the through slit partially crosses the third linear portion along a perpendicular direction with respect to said vertical axis, the through slit having a through slit end that falls before the first free end.

6. The coupling device of claim 1, wherein $16<\beta<28°$.

7. A system of couplable prefabricated panels, comprising a first prefabricated panel and a second prefabricated panel and at least one coupling device configured to couple said first prefabricated panel with said second prefabricated panel, the first and second prefabricated panels having a first groove and a second groove, respectively, wherein said at least one coupling device comprises:

a foil key extending over a first reference plane defined by a transversal axis and a longitudinal axis;

a metallic coupling element extending from said first reference plane, the metallic coupling element comprising:

a first tapered element extending to a first predefined height on a first side of said first reference plane; and a second tapered element extending to a second predefined height on a second side of said first reference plane, opposite to said first side, said first and second tapered elements comprising a first and a second mutually facing bases, respectively, each extending along a first length and a second length on the first reference plane;

wherein said first and second tapered elements each comprises a first wing and a second wing symmetrical with respect to a second reference plane defined by the longitudinal axis and a vertical axis perpendicular to said first reference plane, the first wing and the second wing each comprising a plurality of fast-connected portions, defined on a third reference plane, which is defined by the transversal axis and the vertical axis, as follows:

a first linear portion extending from said first and second bases, respectively, with an angle $10<\beta<45°$ with respect to said vertical axis;

a second elbow portion extending from said first linear portion;

wherein the foil key is configured to rotate said metallic coupling element from a rest position in which each tapered element is inserted in the respective groove with said first length substantially oriented along said respective groove so that each tapered element is free to move along the respective groove, to a locked position in which each tapered element is inserted in the respective groove with said second length substantially oriented along said respective groove so that each tapered element is constrained to the respective groove along said first reference plane, and vice versa;

wherein:

the first groove and the second groove, respectively, have dovetail-shaped cross sections, each groove being formed by a first oblique side and a second oblique side each having a first end and a second end, and a third side joining the first end of said first oblique side to the first end of said second oblique side;

the first and second oblique sides have a first projection and a second projection, respectively, each projection respectively arranged at the second end of a respective oblique side and protruding to respectively form a first step and a second step with the respective oblique side between a first protruding wall adjacent to said respective oblique side and a second protruding wall adjacent to said first protruding wall, said first and second projections facing each other;

the first and second tapered elements are symmetrical with respect to the first reference plane;

the first and second tapered elements are fast connected to said foil key;

the first wing and the second wing each comprises a third linear portion extending from said second elbow portion up to a first free end with an angle $\gamma \cong 90° - \beta$ with a tolerance of $\pm 2°$ with respect to said vertical axis; and wherein said first free end is rounded-shaped on both sides transversely to a main direction of extension of the respective first free end so that, when the first and second prefabricated panels are in the locked position, each first protruding wall abuts against said first free end.

8. The system of claim 7, wherein said metallic coupling element is made of metal sheet.

9. The system of claim 8, wherein said foil key is made of metal.

10. The system of claim 7, wherein:

the plurality of fast-connected portions further comprises a fourth projecting portion that protrudes from said first linear portion, away from said vertical axis, up to a second free end;

said second free end is rounded-shaped transversely to a main direction of extension of the respective second free end; and; and said second free end is configured to abut against said second protruding wall in the locked position.

11. The system of claim 10, wherein the third linear portion and the fourth projecting portion form an angle $\alpha \cong \beta$ therebetween.

12. The system of claim 7, wherein the first and second tapered elements are formed in a single piece.

13. The system of claim 7, wherein the first and second tapered elements are formed in two separate pieces, fast connected along said first base and said second base through said foil key.

14. The system of claim 13, further comprising a foldable coupling portion for each tapered element, the foldable coupling portion projecting with respect to said base, the fifth coupling portion crossing a corresponding opening of the foil key and being folded about the base of the tapered element symmetrical to said first reference plane.

15. The system of claim 7, wherein the first and second tapered elements comprise a through slit along said vertical axis adapted to receive a metal reinforcing element, and wherein, in the first and second wings, said through slit completely crosses the first and second bases, the first linear portion and the second elbow portion, while the through slit partially crosses the third linear portion along a perpendicular direction with respect to said vertical axis, the through slit having a through slit end that falls before the first free end.

16. The system of claim 15, wherein, when the metal reinforcing element is inserted in the through slit, an edge of the metal reinforcing element oriented towards said first free end is at a distance d>0 from the through slit end, the distance d being sized to provide a maximum moving back of the first and second wings in a direction of said first length in the locked position.

17. The system of claim 15, wherein said perpendicular direction coincides with a direction of said first length.

18. The system of claim 15, wherein the metal reinforcing element comprises fastening means for fastening the metal reinforcing element to said first and second tapered elements, the fastening means being configured to fasten the metal reinforcing element after an insertion of the metal reinforcing element in said through slit.

19. The system of claim 18, wherein the fastening means comprise two tongues inelastically extendible in a direction perpendicular to said metal reinforcing element so as to counteract with the first or second base outside said through slit.

20. The system of claim 15, wherein said first and second tapered elements are formed as a single piece with a first and a second foil semi-keys, respectively, which are mutually fastened on a side of said first and second bases through said metal reinforcing element to form said at least one coupling device.

21. The system of claim 7, wherein said foil key has a first surface and a second surface opposite to said first surface, there being provided, on each of said first and second surfaces, at least a boss configured to contact a front wall adjacent to said second protruding wall and perpendicular to said vertical axis.

22. The system of claim 7, wherein $16 < \beta < 28°$.

23. The system of claim 7, wherein said foil key has a first surface and a second surface opposite to said first surface, there being provided, on each of said first and second surfaces a protruding element configured to contact a curved wall provided between said second protruding wall and a front wall and perpendicular to said vertical axis.

24. A method for coupling a first prefabricated panel and a second prefabricated panel, the first prefabricated panel having a first groove and the second prefabricated panel having a second groove along respective groove directions, the first groove and the second groove, respectively, having dovetail-shaped cross sections, each groove being formed by a first oblique side and a second oblique side each having a first end and a second end, and a third side joining the first end of said first oblique side to the first end of said second oblique side, the first and second oblique sides having a first projection and a second projection, respectively, each projection respectively arranged at the second end of a respective oblique side and protruding to respectively form a first step and a second step with the respective oblique side between a first protruding wall adjacent to said respective oblique side and a second protruding wall adjacent to said first protruding wall, said first and second projections facing each other, the coupling being effected by means of a coupling device comprising:

a foil key extending over a first reference plane defined by a transversal axis and a longitudinal axis;

a metallic coupling element extending from said first reference plane, the metallic coupling element comprising:

a first tapered element extending to a first predefined height on a first side of said first reference plane;

a second tapered element extending to a second pre-defined height on a second side of said first reference plane opposite to said first side, said first and second tapered elements comprising a first and a second mutually facing bases, respectively, each extending along a first length and a second length on the first reference plane;

wherein said first and second tapered elements each comprises a first wing and a second wing symmetrical with respect to a second reference plane defined by the longitudinal axis and a vertical axis perpendicular to said first reference plane, the first wing and the second wing each comprising a plurality of fast-connected portions, defined on a third reference plane, which is defined by the transversal axis and the vertical axis as follows:

a first linear portion extending from said first and second bases, respectively, with an angle $10<\beta<45°$ with respect to said vertical axis;

a second elbow portion extending from said first linear portion;

wherein the foil key is configured to rotate said metallic coupling element from a rest position in which each tapered element is configured to be inserted in the respective groove with said first length substantially oriented along said respective groove so that each tapered element is free to move along the respective groove, to a locked position in which each tapered element is inserted in the respective groove with said second length substantially oriented along said respective groove so that each tapered element is constrained to the respective groove along said first reference plane, and vice versa;

wherein the first and second tapered elements are symmetrical with respect to the first reference plane;

the first and second tapered elements are fast connected to said foil key;

the first wing and the second wing each comprise a third linear portion extending from said second elbow portion up to a first free end with an angle $\gamma\cong90°-\beta$ with a tolerance of $\pm2°$ with respect to said vertical axis; and wherein said first free end is rounded-shaped on both sides transversely to a main direction of extension of the respective first free end so that, when the first and second prefabricated panels are in the locked position, each first protruding wall abuts against said first free end, the method comprising:

bringing the first prefabricated panel and the second prefabricated panel close together, so that the respective groove directions are parallel and the first and second grooves face each other, inserting the metallic coupling element inside the grooves, so that the longitudinal axis is perpendicular to said respective groove directions; and rotating the coupling device about the vertical axis so that the longitudinal axis is at an angle of 0-30° relative to said respective groove directions and at least two-thirds of the foil key lies between the first and second prefabricated panels.

\* \* \* \* \*